United States Patent
Martinez et al.

(10) Patent No.: US 7,812,609 B2
(45) Date of Patent: Oct. 12, 2010

(54) ANTENNAS FOR DEEP INDUCTION ARRAY TOOLS WITH INCREASED SENSITIVITIES

(75) Inventors: Ismael Martinez, Mexico City (MX);
Dean M. Homan, Sugar Land, TX (US);
Laurent Villegas, Houston, TX (US);
Gary A. Hazen, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 367 days.

(21) Appl. No.: 11/961,751

(22) Filed: Dec. 20, 2007

(65) Prior Publication Data

US 2009/0160449 A1    Jun. 25, 2009

(51) Int. Cl.
*G01V 3/18* (2006.01)
*H01F 27/28* (2006.01)

(52) U.S. Cl. ...................... 324/339; 336/230
(58) Field of Classification Search .......... 324/339, 324/343, 345–347, 354–355, 357, 359, 334, 324/338; 702/7, 11–13; 336/230
See application file for complete search history.

(56) References Cited

U.S. PATENT DOCUMENTS

| | | | |
|---|---|---|---|
| 3,327,203 A | 6/1967 | Attali | |
| 7,027,922 B2 | 4/2006 | Bespalov et al. | |
| 7,046,009 B2 | 5/2006 | Itskovich | |
| 7,093,672 B2 | 8/2006 | Seydoux et al. | |
| 2002/0080083 A1 | 6/2002 | Nantz et al. | |
| 2007/0024286 A1 | 2/2007 | Wang | |
| 2010/0013664 A1* | 1/2010 | Zierolf | 340/854.6 |

FOREIGN PATENT DOCUMENTS

| | | |
|---|---|---|
| EP | 1308884 | 5/2003 |
| EP | 1727163 | 11/2006 |
| GB | 552949 | 4/1943 |
| WO | WO0248743 | 6/2002 |

* cited by examiner

*Primary Examiner*—Bot L LeDynh
(74) *Attorney, Agent, or Firm*—Darla Fonseca; Charlotte Rutherford

(57) ABSTRACT

Improved receiver antennas are disclosed for long offset tensor induction array logging tools. The disclosed antennas include a bobbin which accommodates a ferromagnetic core. The outer surface of the bobbin is wrapped around a binding so that winding is thicker or includes more turns towards a center of the bobbin and is thinner or includes less turns towards the outer ends of the bobbin. The result is that the primary winding with a curved or parabolic profile that enhances the effective magnetic permeability and magnetic moment of the antenna. A secondary winding may also be utilized for flux feedback compensation. The elimination of winding turns towards the ends of the magnetic coil result in reduced DC resistance and the reduction in parasitic capacitance of the antennas. The disclosed antennas may be used in x-y-z receiver arrays.

23 Claims, 3 Drawing Sheets

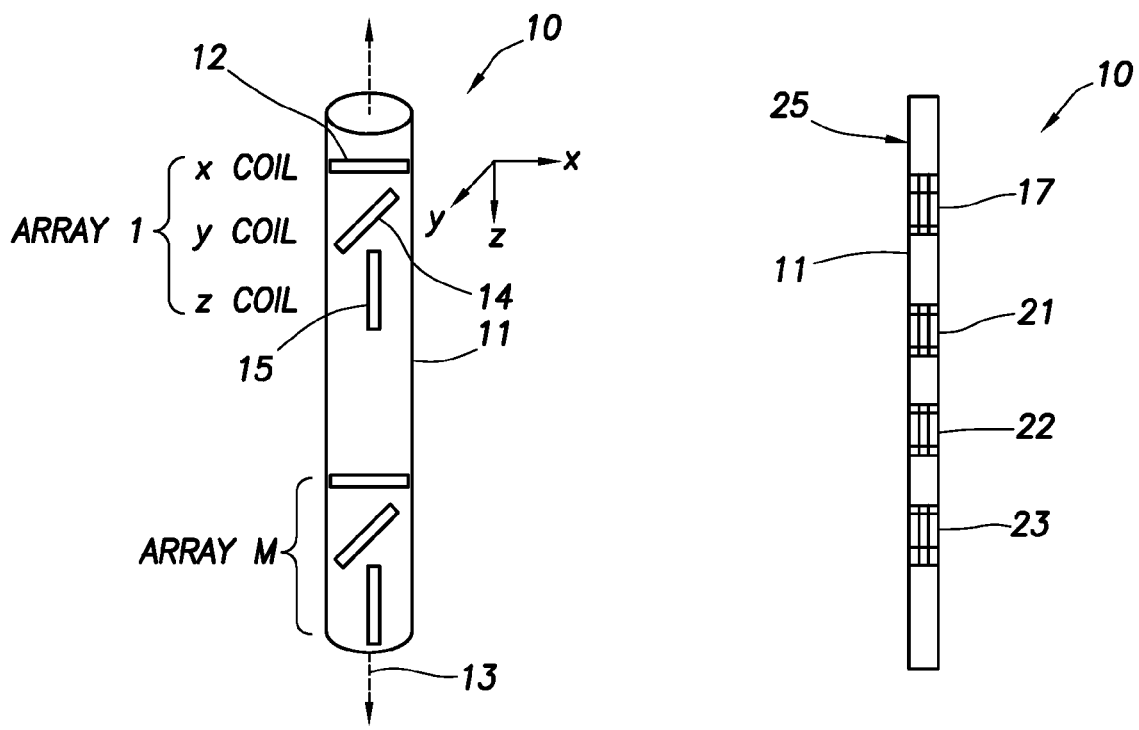
FIG.1A
FIG.1B
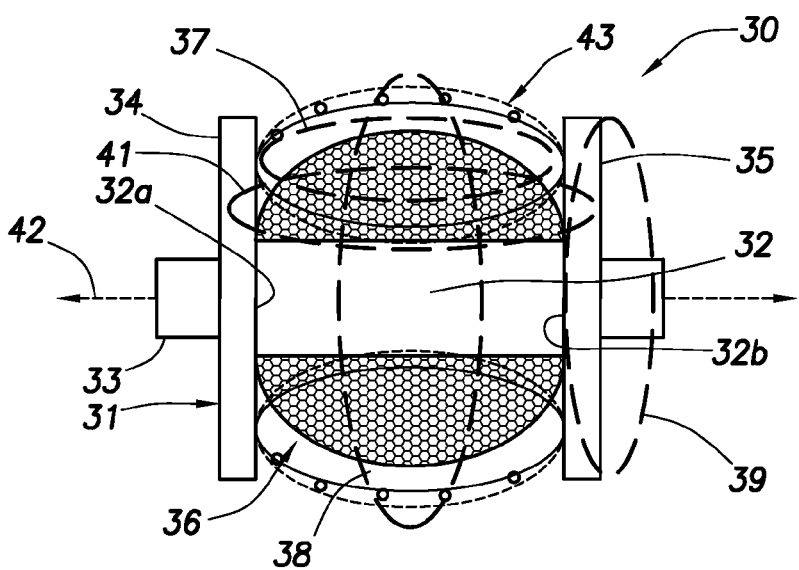
FIG.2

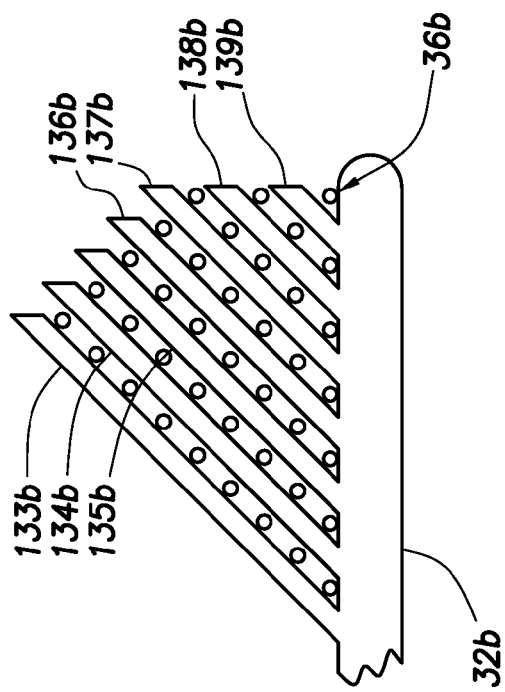
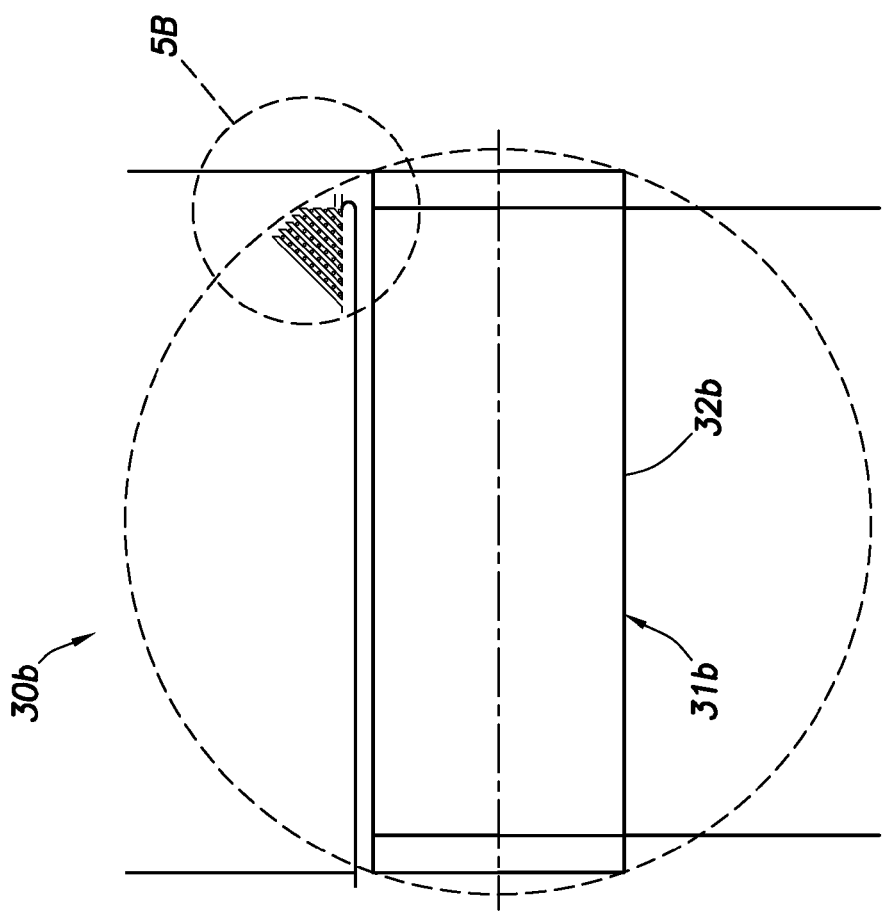

ANTENNAS FOR DEEP INDUCTION ARRAY TOOLS WITH INCREASED SENSITIVITIES

BACKGROUND

1. Technical Field

Induction array tools and related techniques for formation resistivity logging are disclosed. More specifically, antennas for induction array tools for long transmitter-receiver off-sets, with increased sensitivities and related methods of use in resistivity measurements and formation or reservoir geometry are disclosed. Still more specifically, a deep triaxial resistivity tensor measurement tool is disclosed which assists in understanding geometries of hydrocarbon bearing formations. The disclosed tool can be used during the production phase of a reservoir to assist in understanding of induced or natural water fronts.

2. Description of the Related Art

Electromagnetic (EM) induction array toots are used in the oil and gas industry to determine the resistivity of earth formations surrounding a borehole. Because hydrocarbons have a higher resistivity than water or salt water, resistivity measurements are a primary means for locating or confirming the presence of hydrocarbon deposits in a formation. EM induction array tools work by using a transmitting coil or antenna (transmitter) to set up an alternating magnetic field in the earth formation. This alternating magnetic field induces eddy currents in the formation being evaluated.

A plurality of receiving coils or antennas (receivers), disposed at varying distances from the transmitter antenna is used to detect the current flowing in the formation. The transmitter-receiver spacings are typically less than a few meters. Multiple receiver antennas are used to focus formation current loops both radially (depth of investigation) and axially (vertical resolution). The magnitudes of the received signals arc essentially proportional to the formation conductivity and inversely proportional to the formation resistivity. Therefore, formation resistivities at varying distances from the borehole may be derived from the received signals. Varying depths of investigation are needed to evaluate the true formation resistivity and to compensate for borehole fluid invasion of the formation.

Conventional wireline and logging while drilling (LWD) EM induction array tools are equipped with coils or antennas that may function as both current sources or transmitters and receivers or sensors. The antennas of wireline EM induction tools are typically enclosed by an oil compensated housing (or tool body) constructed of a tough thermal-set or thermal plastic (insulating) material, e.g., a laminated fiberglass material impregnated with epoxy resin. The coils of LWD EM induction, array tools are generally mounted on metallic supports (collars) to withstand the harsh environments encountered during drilling.

The antennas of both wireline and LWD induction array tools are typically spaced apart from each other along the axis of the tool for different depths of investigation. In addition to borehole fluid invasion, formation anisotropy can also complicate resistivity logging and interpretation. Formation anisotropy results from the manner in which formation beds were deposited by nature. Formations containing hydrocarbons often exhibit anisotropy in formation resistivity. In such formations, the horizontal resistivity in a direction parallel to the bedding plane differs from the vertical resistivity in a direction perpendicular to the bedding plane. Further, formation analysis is also problematic for thin or highly laminated beds due to a lack of sensitivity of logging tools.

The antennas of induction array tools are typically of the solenoid-type that comprises one or more turns of an insulated conductor wire coil wound around a support. An antenna carrying a current can be represented as a magnetic moment proportional to the current and the area of the antenna. The direction and magnitude of the magnetic moment can be represented by a vector perpendicular to the plane of the coil.

In older induction and propagation logging instruments, the transmitter and receiver antennas were mounted with their magnetic moments aligned with the longitudinal axis of the instruments. As a result of this alignment, these instruments have longitudinal magnetic dipoles (LMD). When an LMD tool is placed in a borehole and energized to transmit EM energy, the induced eddy currents flow in loops around the antenna in the borehole and in the surrounding formation. The induced eddy currents flow in planes that are perpendicular to the tool axis and therefore the borehole axis. As a result, little or no eddy current flows up or down the borehole when the tool is centralized in the borehole.

More recently, the use of instruments incorporating antennas having tilted or transverse antennas, i.e., the magnetic dipoles of the antennas are tilted or perpendicular to the tool axis. As a result, these instruments have transverse or tilted magnetic dipoles (TMD). TMD instruments can induce eddy currents that flow up and down the borehole and, thus, provide measurements that are sensitive to dipping planes, formation fractures, or formation anisotropy. Modern induction tools typically include tri-axial arrays, in which the transmitter and receiver co-located groups or "banks" may each comprise three coils arranged in different orientations (typically in orthogonal x, y- and z-directions). For a given transmitter-receiver spacing one measures a complex conductivity matrix given as $$\sigma_{apparent} = \begin{pmatrix} \sigma_{xx} & \sigma_{xy} & \sigma_{xz} \\ \sigma_{yx} & \sigma_{yy} & \sigma_{zx} \\ \sigma_{zx} & \sigma_{zy} & \sigma_{zz} \end{pmatrix}$$

which can be inverted for horizontal resistivity (Rh), vertical resistivity (Rv), dip angle and azimuth assuming a dipping layered earth model.

While the TMD tools (including tri-axial tools) are capable of providing additional information about the formation resistivity, these tools are more strongly affected by the borehole for transmitter-receiver spacings less than a few meters, particularly in high contrast situations, when the mud in the borehole is more conductive than the formation. For transmitter-receiver spacings greater than a few meters, there is little borehole effect in the apparent conductivity tensor. Further, at least partially due to the lack of sensitivity of currently available wireline and LWD EM induction array tools, geologists and petrophysicists historically have found it necessary to visually analyze core samples extracted from zones of interest to assess complex or thinly laminated reservoirs and aid in the discovery of hydrocarbons. Because core samples can be difficult and/or costly to obtain, EM induction array tools with increased sensitivities are needed for the tensor conductivity volumetric measurements required to evaluate reservoir geometry and water/hydrocarbon boundary movement.

SUMMARY OF THE DISCLOSURE

To satisfy the above needs, improved antennas for induction logging tools are disclosed. One improved antenna comprises a bobbin comprising a hollow cylinder having two ends. The cylinder accommodates an elongated core comprising magnetic material. The cylinder is wrapped within a primary winding that extends between the ends of the cylinder. The primary winding has a cross-sectional profile such that the primary winding is thicker at a mid-point between the ends of the cylinder and the primary winding is smaller at either end of the cylinder. Thus, the number of turns of the primary winding at the middle or a mid-point of the bobbin cylinder is greater than the number of turns at the outer ends of the bobbin cylinder.

In a refinement, the antenna further comprises a secondary winding wrapped around the primary winding.

In another refinement, the primary winding comprises a wire of a first gauge and the secondary winding comprises a wire of a second gauge that is smaller than the first gauge.

In another refinement, the cross-sectional profile of the primary winding is parabolic with a maximum radius at the midpoint between the ends of the cylinder.

In another refinement, the axial length of the primary winding ranges from about 50 to about 90% of the axial length of the core.

In a refinement, the core has an aspect ratio ranging from about 3 to about 5, more preferably from about 3.5 to about 4.5, still more preferably from about 3.8 to about 4.

In a refinement, the winding is wrapped around the bobbin using a melt bonding process that melts the coating of the magnet wire one layer upon the next until a resultant solid wound part is formed around the ferrite. The result is a sensor that is stable under 20 kpsi and 150° C. downhole conditions.

In another refinement, the bobbin cylinder passes through a plurality of flanges that extend outward from the cylinder. The flanges are disposed between the ends of the cylinder. The flanges divide the cylinder into a plurality of bins, with each bin accommodating part of the primary winding. In such an embodiment that includes a secondary winding, the secondary winding is a larger wire than the wire of primary winding. In one embodiment, the middle flanges extend radially outward from the cylinder and are a generally parallel to one another. In another embodiment, the middle flanges are conically shaped and extend outward from the cylinder at a non-perpendicular angle with respect to the longitudinal axis of cylinder.

In various refinements, the primary and secondary windings form a bifilar winding. For embodiments utilizing a bifilar winding, the secondary winding may be connected to a variable shunt resistor.

An improved induction logging tool is disclosed that comprises a plurality of antennas, each antenna made in accordance with one or more embodiments described herein.

In a refinement, the plurality of antennas of the improved induction tool further comprises a plurality of arrays of antennas. Each array of antennas comprises three antennas made in accordance with one or more embodiments described herein and including an x-antenna wherein the cylinder of the x-antenna is aligned perpendicular to the longitudinal axis of the tool, a y-antenna wherein the cylinder of the y-antenna is aligned perpendicular to the longitudinal axis of the tool and perpendicular to the cylinder of the x-antenna, and a z-antenna wherein the cylinder z-antenna is aligned parallel to the longitudinal axis of the tool.

In a refinement, arrays of antennas comprises three receiver antenna arrays including a shallow array spaced from about 1 to about 15 meters from the transmitter, a medium array spaced from about 20 to about 40 meters from the transmitter, and a deep array spaced from about 50 to about 200 meters from the transmitter. It is anticipated that a typical logging tool string will include at least shallow, medium and deep antenna arrays spaced about 10, 30 and 100 meters from the transmitter antenna. More than three arrays with different spacings are possible.

An improved method for designing an induction logging tool is disclosed that comprises: disposing a tri-axial transmitter and a plurality of receiver antennas in a longitudinally spaced-apart relationship in an elongated tool body, with each receiver antenna comprising a bobbin comprising a hollow cylinder having two ends, each cylinder accommodating an elongated core comprising magnetic material, each cylinder being wrapped within its own primary winding that extends between the ends of said each cylinder, each primary winding comprising a greater number of turns at a mid-point of its respective cylinder than a number of turns at either end of its respective cylinder thereby resulting in each primary winding being thicker at said mid-point of its respective cylinder than at the ends of its respective cylinder, and a secondary winding wrapped around each of said primary windings.

An improved method for well logging using an induction tool is also disclosed. The tool comprises an induction transmitter antenna and a plurality of induction receiver antennas disposed in an elongated housing and spaced apart from each other along a longitudinal axis of the housing. Each antenna comprises a bobbin comprising a hollow cylinder having two ends. Each cylinder accommodates an elongated core comprising magnetic material and each cylinder is wrapped within its own primary winding that extends between the ends of said each cylinder. Each primary winding comprises a greater number of turns at a mid-point of its respective cylinder than a number of turns at either end of its respective cylinder thereby resulting in each primary winding being thicker at said mid-point of its respective cylinder than at the ends of its respective cylinder. Each antenna also comprises a secondary winding wrapped around each of said primary windings. The improved method comprises: disposing the tool string in a well bore; acquiring a first tensor resistivity measurement using the of the receiver antennas and a second tensor resistivity measurement using another of the receiver antennas; acquiring a shallow tensor resistivity measurement; and processing the first resistivity measurement, the second resistivity measurement, and the shallow resistivity measurement to provide a formation resistivity value and geometry through an inversion.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein;

FIG. 1A is a partial schematic illustration of an induction logging tool made in accordance with this disclosure, particularly illustrating a plurality of receiver antenna arrays;

FIG. 1B is another schematic illustration of an induction logging tool made accordance with disclosure;

FIG. 2 is a sectional view of an antenna designed in accordance with this disclosure;

FIG. 5A is a sectional, view of an antenna bobbin and primary winding made in accordance with a third embodiment; and FIG. 5B is an enlarged partial sectional view of the antenna bobbin and primary winding shown in FIG. 5A.

Figure 3:
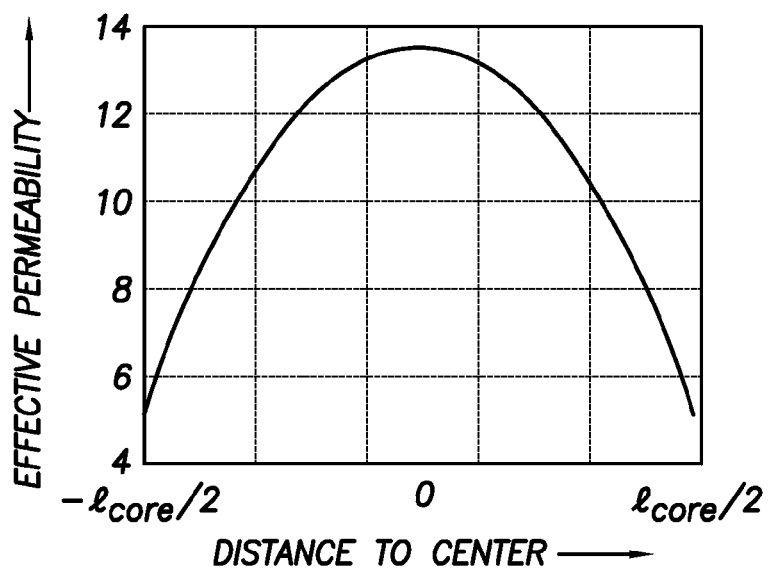
FIG. 3 graphically illustrates the benefits of the primary winding profile of the antenna illustrated in FIG. 2 and specifically the benefits of placing a greater number of primary winding turns toward the center of the bobbin and ferromagnetic core and a smaller number of turns at the ends of a bobbin.

It should be understood mat the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

The improved antenna designs disclosed herein are suited for use in modified downhole induction logging tools. Currently available deep induction tools are disclosed, for example, in U.S. Pat. Nos. 7,093,672, 7,046,009 and 7,027,922. For example, the sensitive antennas disclosed herein can be places along the tool string with shallow, medium and deep spacings of around 10, 30, and 100 meters. Ultra deep spacings could be in the range of 200 meters or more. Sets or arrays of orthogonal coils yield a 3×3 conductivity matrix measurement of the reservoir from which is inverted to the formation resistivities and which can be used to generate a three dimensional resistivity image of the formation.

Therefore, without going into exhaustive detail about how logging while drilling ("LWD") induction tools are designed, FIGS. 1A and 1B illustrate the type of induction logging tools that are candidates for the disclosed improved antennas. In FIG. 1A, a partial view of a tool 10 is disclosed which includes a cylindrical casing 11 that houses a plurality of antenna arrays or "banks." In the embodiment 10 illustrated in FIG. 1A, each array includes an antenna 12 aligned with and x-axis that is perpendicular to a longitudinal axis 13 of the tool 10, a y-axis antenna 14 that is perpendicular to both the longitudinal axis 13 and the x-antenna 12 and a z-antenna 15 that is parallel or in general alignment with the longitudinal axis of the tool 10. This antenna array is also known as a tri-axial array. The tool 10 includes a plurality of arrays illustrated schematically in FIG. 1B. Referring to FIG. 1B, the lower pipe, tubing or housing 11 of foe tool 10 includes a tri-axial transmitter 17, three shallow, medium, and deep arrays shown at 21-23 and an upper electronic housing shown at 25. This disclosure is directed primarily to the antennas or the shallow, medium and deep arrays 21-23. FIG. 1B is not to scale as the spacings for the arrays 21-23 from the transmitter 17 will be on the order of 10, 30 and 100 meters for the shallow 21, medium 22 and deep 23 antenna arrays. Longer spacings arc envisioned. Further, a transmitter could be located in an adjacent borehole or at the surface.

One disclosed antenna 30 is shown in FIG. 2. The antenna 30 includes a bobbin 31 that comprises a central cylinder 32. The hollow cylinder 32 accommodates a ferromagnetic core 33. It will be noted here that, preferably, the length of the core 33 is greater than the overall length of the bobbin 31. In the embodiment shown in FIG. 2, the bobbin 31 also includes end flanges 34, 35.

The cylinder 32 is wrapped with a primary winding 36. It will be noted that the winding 36 comprises continuous wire that is wrapped in such a way that the number of turns around the cylinder 32 towards the middle of the cylinder exceeds the number of turns around the cylinder 32 towards the end of the cylinder 32, near the end of the end flanges 34, 35. Because the end flanges 34, 35 are not essential it can generally be stated that winding 36 includes more turns about a middle section of the cylinder 32 then about the cylinder ends 32a, 32b. As shown in FIG. 2, cross-sectional profile of the winding 36 is ball-shaped or parabolic with the thick portion of the winding 36 appearing at or about the middle of the cylinder 32.

Important features to note from the antenna 30 of FIG. 2 is the relatively large cross-section represented by the area shown at 37 projecting perpendicular to the longitudinal axis 42 of the core 33 and cylinder 32. Also, the increased number of windings in the central area 38 as compared to the areas near or slightly inward from the ends 32a, 32b of the cylinder contribute to improved performance of the antenna 30 because more turns are provided in the central area of the cylinder 32 as apposed to the less effective end areas, shown at 39. It has been found that the design of the antenna 30 as shown in FIG. 2 provides a highly-effective magnetic permeability through the area 41 that is normal or perpendicular to the antenna longitudinal axis 42.

FIG. 2 also illustrates the use of a secondary winding 43. The purpose of the secondary winding 43 is for flux feedback compensation. It is also preferred that the length of the ferromagnetic core 33 be greater than the axial length of the primary winding 36. The relationship between the axial length of the primary winding 36 and the core 33 may vary. Excellent performance may be provided by primary windings that have an axial length ranging from about 52 to about 90% of the ferromagnetic core length 33. In embodiment shown in FIG. 2, the axial length of the winding 36 is the distance between the inner surfaces of the end flanges 32a, 32b. The axial length of the winding or coil 36 may range from about 40 to about 90% of the length of the core 33, more preferably from about 50 to about 80% of the length of the core 33.

The core 33 can be fabricated from an amorphous material such as Metglas 2714A™ (http://www.metglas.com/) because of its ultrahigh permeability and high resistivity. Furthermore, this cobalt-based amorphous material is available as a thin tape (0.6 mils of thickness) leading to much lower eddy current losses, near-zero magneto-striction and is highly insensitive to mechanical stress. Other ferrite materials for the core 33 are available and known to those skilled in the art. The Curie temperature of Metglas 2714A is 225° C., which is beyond the operation range of the disclosed sensors 21-23. The aspect ratio of the core 33 can be optimized to maximize the magnetic moment of the sensors 21-23. The preferred aspect ratio for the core 33 can vary widely and preferred ratios range from about 3 to about 5, more preferably from about 3.8 to about 4. In most embodiments, the length of the core 33 will be limited to about 3" due to space requirements. The preferred aspect ratio will depend upon the material selected for the core 33 diameters of the wire used for the winding 36. The wire diameter may range from about 26 to about 31 AWG.

FIG. 3 illustrates graphically the improved performance provided by antenna having designs similar to foe antenna 30 in FIG. 2. The effective permeability is found to be greater at the middle of the bobbin 31 or towards the middle of the cylinder 32. As the effective magnetic permeability is reduced towards the ends of the cylinder 32a, 32b or towards the ends of the primary winding 36, fewer winding turns towards the ends and more winding ends towards the center of the cylinder increase the magnetic permeability, thereby enhancing the magnetic moment provided by the antenna 30 and therefore the sensitivity of the antenna 30. Without being bound to any particular theory, it is believed that the combination of the ferromagnetic core 33 and the profile of the primary winding 36 contribute to the improved effective permeability, the enhanced magnetic permeability, the enhanced magnetic moment, and the increased sensitivity at the antenna 30. As a result, the antenna 30 is ideal for increasing the sensitivities of long offset induction logging tools making induction tools more suitable for thin, laminated beds and more reliable deep tensor resistivity measurements.

As space within a downhole tool string is limited, less effective turns of the primary winding 36 are eliminated without comprising performance as the outer less effective turns do not contribute substantially to the effective magnetic permeability. Further, the elimination of primary winding turns towards the ends of the bobbin 31 and/or core 33 reduces the amount of DC resistance and parasitic capacitance of the antenna 30.

In summary, the increased number of turns toward the middle of the cylinder 32 or the middle of the primary winding 36 utilizes the effective magnetic permeability found near the center of the ferrite rod 33. The reduced number of turns towards the ends 32a, 32b of the cylinder 32 increases the effective surface area contributes to the curved ball-shaped or parabolic profile of the primary winding 36, which increases the surface area shown at 37. The increased number of turns in the central area 38 in combination with the increased surface area 37 utilizes the effective magnetic permeability through the area shown at 41. The result is an effective permeability profile like the one shown in FIG. 3. The increased effective permeability and enhanced magnetic moment provide increased sensitivity.

Preferably, the winding 36 is coated with a polymeric sheath that will melt upon heat treatment. As the winding 36 is wrapped around the cylinder 32, the winding 36 is heated, thereby melting the sheath and causing the turns of the winding to adhere to underlying or adjacent turns. As a result, the winding 36 forms a solid structure that provides an antenna 30 that is stable at high temperatures and pressures (e.g., 20 kpsi and 150° C. downhole conditions).

Figure 4A:
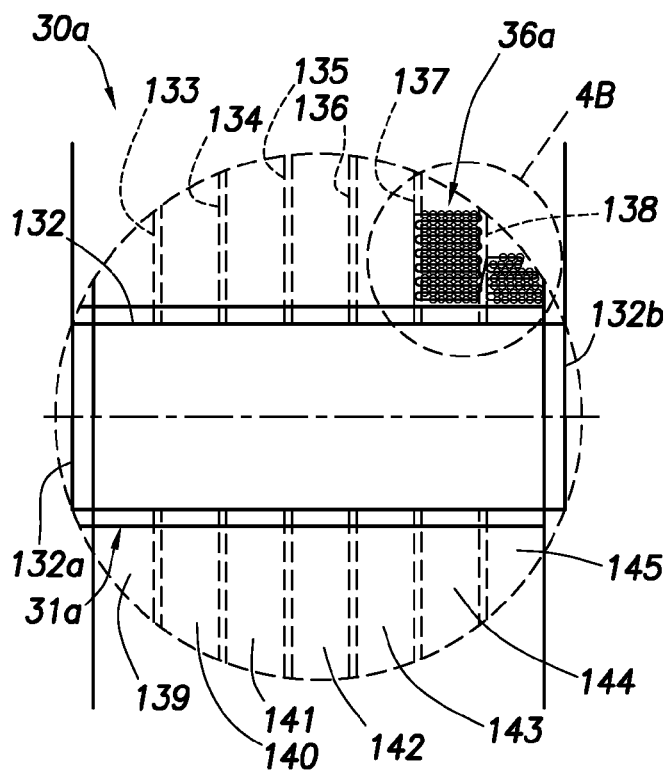
FIG. 4A is a sectional view of an antenna bobbin and primary winding made in accordance with a second embodiment.
Figure 4B:
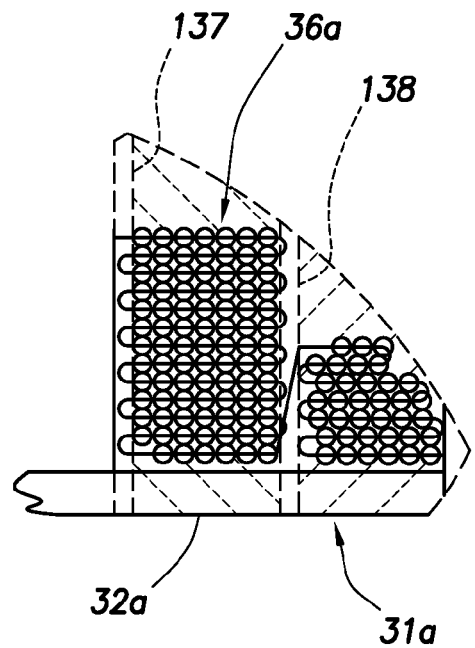
FIG. 4B is an enlarged partial sectional view of the antenna bobbin and primary winding shown in FIG. 4A.

Two alternative bobbin designs are shown in FIG. 4A-5B. Turning first to FIG. 4A-4B, the bobbin 31a includes a cylinder 132 with opposing ends 132a, 132b. The main cylindrical portion 132 passes through a plurality of radial flanges 133-138. The flanges 133-138 effectively divide the bobbin 131a to a plurality of "bins" 139-145. The primary winding 36a is wrapped within these bins 139-145. In one embodiment, the primary winding 36a is a bifilar winding or a dual-wire winding whereby one of the wires serves as the primary winding and the second wire serves as the secondary winding. To increase the number of turns, the gauge of the secondary winding can be small. The secondary winding can also be shunted with a small resistor or a variable resistor to broaden the response of the antenna 30a across its natural resonance and to vary the gain to create a larger frequency bandwidth for which the coil will operate. It was found that optimization of the design to a natural resonance near the center of the desired frequency range of operation is preferred.

Turning, to FIGS. 5A-5B, an additional antenna 30b is shown with a cylindrical bobbin 31b featuring a cylinder 32b. The cylinder 32b is connected to a plurality of slanted or conically shaped fins, some of which are shown in FIG. 5B 133b-139b. The primary winding 36b is wrapped within the spaces or interstices between the flanges 133b-139b. Again, a bifilar winding may be utilized and a secondary winding or coil may be shunted with a resistor or variable resistor. Both, the antennas 33a and 33b accommodate a central magnetic core (not shown) in FIGS. 4A-5B.

The disclosed antennas 30, 30a, 30b may be used as receivers in an induction or propagation resistivity logging tool string 10 due to their high impedance. The antennas 30, 30a, 30b provide increased sensitivity through higher effective permeabilities and enhanced magnetic moments. An antenna array may comprise a tri-axial antenna configuration, meaning each antenna in the array has its dipole moment parallel to an axis that is orthogonal to each of the other antenna dipole moments. The antenna array may also comprise one or more tilted antennas, meaning the dipole moment of the tilted antenna is neither parallel nor transverse to the tool axis.

While only certain embodiments have been set forth, alternatives and modifications will be apparent from the above description to those skilled in the art. These and other alternatives are considered equivalents and within the spirit and scope of this disclosure and the appended claims.

What is claimed is:

1. An antenna for an induction or propagation logging system, the antenna comprising:
   a bobbin comprising a cylinder having two ends,
   the cylinder being wrapped within a primary winding that extends between the ends of the cylinder, the primary winding having a cross-sectional profile taken through a plane that passes through a longitudinal axis of the cylinder, the cross-sectional profile having a variable outer radius as the primary winding extends between the ends of the cylinder, the variable outer radius being smaller at either end of the cylinder than at a midpoint between the two ends of the cylinder, further comprising a secondary winding wrapped around the primary winding.

2. The antenna of claim 1 wherein the primary winding comprises a wire of a first gauge, the secondary winding comprises a wire of a second gauge that is smaller than the first gauge.

3. The antenna of claim 1 wherein the cross-sectional profile of the primary winding is parabolic with a maximum radius at the midpoint between the ends of the cylinder.

4. The antenna of claim 1 wherein the core has an axial length and the primary winding has an axial length as the primary winding extends between the ends of the cylinder, the axial length of the primary winding ranging from about 50 to about 80% of the axial length of the core.

5. The antenna of claim 1 wherein the core has an aspect ratio ranging from about 3.8 to about 4.0.

6. The antenna of claim 1 wherein the primary winding comprises a greater number of turns around the cylinder at a mid-point of the cylinder between the two ends of the cylinder than the number of turns at either end of the cylinder.

7. The antenna of claim 1 wherein the primary winding is coated with a polymeric coating that is at least partially melted upon installation about the cylinder to adhere each turn of the primary winding to at least one underlying or adjacent turn.

8. An antenna for an induction or propagation logging system, the antenna comprising:
   a bobbin comprising a cylinder having two ends,
   the cylinder being wrapped within a primary winding that extends between the ends of the cylinder, the primary winding having a cross-sectional profile taken through a plane that passes through a longitudinal axis of the cylinder, the cross-sectional profile having a variable outer radius as the primary winding extends between the ends of the cylinder, the variable outer radius being smaller at either end of the cylinder than at a midpoint between the two ends of the cylinder, wherein the cylinder passes through a plurality of middle flanges extending outward from the cylinder and between the ends of the cylinder, the flanges dividing the cylinder into a plurality of bins, each bin accommodating part of the primary winding.

9. The antenna of claim 8 further comprising a secondary winding wrapped around the primary winding.

10. The antenna of claim 9 wherein the primary winding comprises a wire of a first gauge, the secondary winding comprises a wire of a second gauge that is larger than the first gauge.

11. The antenna of claim 9 wherein the primary and secondary windings form a bifilar winding.

12. The antenna of claim 11 wherein the secondary winding is connected to a variable shunt resistor.

13. The antenna of claim 8 wherein the middle flanges extend radially outward from the cylinder.

14. The antenna of claim 8 wherein the middle flanges are conically shaped and extend outward from the cylinder at a non-perpendicular angle with respect to the longitudinal axis of cylinder.

15. The antenna of claim 1, wherein the cylinder is hollow and the cylinder is capable of accommodating an elongated core comprising magnetic material.

16. An induction or propagation logging tool comprising:
a transmitter,
a plurality of antennas made in accordance with claim 1, wherein the tool comprises a longitudinal axis, and
the plurality of antennas further comprises a plurality of arrays of antennas, each array of antennas comprising three antennas made in accordance with claim 1 and including an x-antenna wherein the cylinder of the x-antenna is aligned perpendicular to the longitudinal axis of the tool, a y-antenna wherein the cylinder of the y-antenna is aligned perpendicular to the longitudinal axis of the tool and perpendicular to the cylinder of the x-antenna, and a z-antenna wherein the cylinder z-antenna is aligned parallel to the longitudinal axis of the tool.

17. The logging tool of claim 16 wherein the plurality of arrays of antennas comprises a shallow array spaced from about 1 to about 15 meters from the transmitter, a medium array spaced from about 20 to about 40 meters from the transmitter, and a deep array spaced from about 50 to about 200 meters from the transmitter.

18. An induction or propagation logging system comprising:
an elongated tool string having a longitudinal axis,
a tri-axial transmitter,
a plurality of receiver antenna arrays, each receiver antenna array comprising three receiver antennas, each receiver antenna comprising
a bobbin comprising a hollow cylinder having two ends,
each cylinder accommodating an elongated core comprising magnetic material,
each cylinder being wrapped within its own primary winding that extends between the ends of said each cylinder,
each primary winding comprising a greater number of turns at a mid-point of its respective cylinder than a number of turns at either end of its respective cylinder thereby resulting in each primary winding being thicker at said mid-point of its respective cylinder than at the ends of its respective cylinder, and
one secondary winding wrapped around each of said primary windings,
each receiver antenna array comprising an x-antenna wherein the cylinder of the x-antenna is aligned perpendicular to the longitudinal axis of the tool, a y-antenna wherein the cylinder of the y-antenna is aligned perpendicular to the longitudinal axis of the tool and perpendicular to the cylinder of the x-antenna, and a z-antenna wherein the cylinder z-antenna is aligned parallel to the longitudinal axis of the tool,
the receiver antenna arrays being spaced apart in the housing along the longitudinal axis thereof.

19. The logging tool of claim 18 wherein each cylinder of each antenna passes through a plurality of flanges extending outward from said cylinder, the flanges dividing said cylinder into a plurality of bins, each bin accommodating part of the primary and secondary windings of said antenna, the primary and secondary windings of each receiver antenna forming a bifilar winding, and each secondary winding being connected to a variable shunt resistor.

20. The logging tool of claim 18 wherein the plurality of receiver antenna arrays comprises a shallow array spaced from about 1 to about 15 meters from the transmitter, a medium array spaced from about 20 to about 40 meters from the transmitter, and a deep array spaced from about 50 to about 200 meters from the transmitter.

21. An induction or propagation logging tool, comprising:
a transmitter antenna array;
a receiver antenna array in a longitudinally spaced-apart relationship relative to the transmitter antenna array in an elongated tool string,
wherein one or more antennas in either of the transmitter or receiver antenna arrays comprise
a bobbin comprising a hollow cylinder having two ends,
each cylinder accommodating an elongated core comprising magnetic material, each cylinder being wrapped within its own primary winding that extends between the ends of said each cylinder, and
each primary winding comprising a greater number of turns at a mid-point of its respective cylinder than a number of turns at either end of its respective cylinder thereby resulting in each primary winding being thicker at said mid-point of its respective cylinder than at the ends of its respective cylinder, and a secondary winding wrapped around each of said primary windings.

22. The logging tool of claim 21, further comprising a plurality of receiver antenna arrays wherein the transmitter antenna array and a first of the plurality of receiver antenna arrays comprise a shallow array spaced from about 1 to about 15 meters apart, the transmitter antenna array and a second of the plurality of receiver antenna arrays comprise a medium array spaced from about 20 to about 40 meters apart, and the transmitter antenna array and a third of the plurality of receiver antenna arrays comprise a deep array spaced from about 50 to about 200 meters apart.

23. A method for well logging using an induction or propagation tool comprising a transmitter antenna and a plurality of receiver antennas grouped in arrays with each array disposed in an elongated housing and spaced apart from each other along a longitudinal axis of the housing, each antenna comprising a bobbin comprising a hollow cylinder having two ends, each cylinder being capable of accommodating an elongated core comprising magnetic material, each cylinder being wrapped within its own primary winding that extends between the ends of said each cylinder, each primary winding comprising a greater number of turns at a mid-point of its respective cylinder than a number of turns at either end of its respective cylinder thereby resulting in each primary winding being thicker at said mid-point of its respective cylinder than at the ends of its respective cylinder, and a secondary winding wrapped around each of said primary windings,
the method comprising:
disposing the tool in a wellbore;
acquiring a shallow resistivity matrix using the one of the arrays receiver antennas spaced from about 5 to about 15 meters from the transmitter,
acquiring a medium resistivity matrix using another of the arrays of receiver antennas spaced from about 20 to about 40 meters from the transmitter;
acquiring a deep resistivity matrix using another of the arrays of receiver antennas spaced from about 50 to about 200 meters from the transmitter;
processing the shallow, medium, and deep resistivity matrices and deriving a formation resistivity profile and formation geometry data therefrom.

* * * * *